(12) United States Patent
Kirschbaum et al.

(10) Patent No.: US 10,992,661 B2
(45) Date of Patent: Apr. 27, 2021

(54) METHOD FOR CONNECTING A MOBILE TERMINAL WITH A SERVER OF A SERVICE PROVIDER VIA AN OPERATOR PLATFORM

(71) Applicant: Orange, Paris (FR)

(72) Inventors: Patrick Kirschbaum, Poigny la Foret (FR); Arnaud Brun, Boulogne Billancourt (FR)

(73) Assignee: ORANGE, Paris (FR)

( * ) Notice: Subject to any disclaimer, the term of this patent is extended or adjusted under 35 U.S.C. 154(b) by 32 days.

(21) Appl. No.: 15/526,627

(22) PCT Filed: Nov. 4, 2015

(86) PCT No.: PCT/FR2015/052979
§ 371 (c)(1),
(2) Date: May 12, 2017

(87) PCT Pub. No.: WO2016/075390
PCT Pub. Date: May 19, 2016

(65) Prior Publication Data
US 2017/0331820 A1    Nov. 16, 2017

(30) Foreign Application Priority Data

Nov. 14, 2014  (FR) ...................................... 1461010

(51) Int. Cl.
*H04L 29/06* (2006.01)
*G06Q 30/02* (2012.01)
(Continued)

(52) U.S. Cl.
CPC ..... *H04L 63/0853* (2013.01); *G06Q 30/0207* (2013.01); *G06Q 30/0261* (2013.01);
(Continued)

(58) Field of Classification Search
CPC ............ H04L 63/0853; H04L 63/0407; G06Q 30/0207; G06Q 30/0261; H04W 12/02; H04W 12/08; H04W 4/025
See application file for complete search history.

(56) References Cited

U.S. PATENT DOCUMENTS

| 7,213,748 B2 * | 5/2007 | Tsuei | ..................... G06Q 10/08 235/375 |
| 7,693,283 B2 * | 4/2010 | Livesay | ............. G06Q 30/0603 380/255 |

(Continued)

FOREIGN PATENT DOCUMENTS

| WO | WO-02093436 A1 * | 11/2002 | ........... G06Q 20/383 |
| WO | WO-03021828 A1 * | 3/2003 | ......... H04N 7/17309 |

(Continued)

OTHER PUBLICATIONS

International Search Report dated Jan. 25, 2016 for corresponding International Application No. PCT/FR2015/052979, filed Nov. 4, 2015.

(Continued)

*Primary Examiner* — Techane Gergiso
(74) *Attorney, Agent, or Firm* — David D. Brush; Westman, Champlin & Koehler, P.A.

(57) ABSTRACT

A method connecting a user's mobile terminal with a server of a service provider. The method includes: the server stores an identifier of a card assigned to the user by the service provider, corresponding to alias data associated with a user identifier by which the mobile terminal is authenticated with the mobile network; storing, in association with the identifier, first data of a first transaction performed between the user and the service provider by using the card; establishing, via the mobile network and using a service platform capable of obtaining the alias data, a communication link between the mobile terminal and the server, in which the alias data (Continued)

authenticate the user with the server; sending to the mobile terminal information regarding a service provided to the user by the service provider in accordance with the first data stored in association with the card identifier corresponding to the alias data.

17 Claims, 6 Drawing Sheets

(51) Int. Cl.
　　　*H04W 12/02*　　　(2009.01)
　　　*H04W 4/02*　　　(2018.01)
　　　*H04W 12/75*　　　(2021.01)
　　　*H04W 12/08*　　　(2021.01)

(52) U.S. Cl.
　　　CPC ......... *H04L 63/0407* (2013.01); *H04W 12/02* (2013.01); *H04W 12/08* (2013.01); *H04W 4/025* (2013.01); *H04W 12/75* (2021.01)

(56) References Cited

U.S. PATENT DOCUMENTS

| | | | | |
|---|---|---|---|---|
| 8,014,757 B1* | 9/2011 | Lim | .................. | H04L 51/38 455/412.1 |
| 8,423,457 B1* | 4/2013 | Schattauer | ............. | G06Q 20/10 705/39 |
| 8,731,586 B2* | 5/2014 | Schmidt | ................ | H04L 63/101 455/466 |
| 9,058,502 B2* | 6/2015 | Schurig | ............... | G06F 21/6218 |
| 2003/0011578 A1* | 1/2003 | Bergqvist | ............ | G06F 3/03545 345/179 |
| 2003/0153302 A1* | 8/2003 | Lewis | .................. | G06Q 20/102 455/412.1 |
| 2004/0083184 A1* | 4/2004 | Tsuei | .................... | G06Q 20/385 705/74 |
| 2004/0098625 A1* | 5/2004 | Lagadec | ............. | H04L 63/0407 726/4 |
| 2004/0203619 A1* | 10/2004 | Tissot | .................... | H04M 3/533 455/412.1 |
| 2004/0203900 A1 | 10/2004 | Cedervall et al. | | |
| 2004/0260653 A1* | 12/2004 | Tsuei | ................. | G06Q 20/4037 705/54 |
| 2006/0026438 A1* | 2/2006 | Stern | ....................... | H04L 51/12 713/184 |
| 2006/0155993 A1* | 7/2006 | Busboon | ............... | H04L 9/3271 713/169 |
| 2006/0172744 A1* | 8/2006 | Tornkvist | .............. | H04W 12/02 455/456.1 |
| 2006/0274896 A1* | 12/2006 | Livesay | .............. | H04L 63/0421 380/255 |
| 2007/0224998 A1* | 9/2007 | Kimbrell | .......... | H04M 3/42008 455/445 |
| 2009/0037982 A1* | 2/2009 | Wentker | .................. | G06F 21/33 726/3 |
| 2009/0124270 A1* | 5/2009 | Kelley | .................... | H04W 8/26 455/466 |
| 2010/0313009 A1* | 12/2010 | Combet | .................. | H04L 67/22 713/150 |
| 2010/0325691 A1* | 12/2010 | Willars | ............... | H04L 67/2819 726/1 |
| 2011/0047040 A1* | 2/2011 | Carlson | .................. | G06Q 20/10 705/26.1 |
| 2011/0047076 A1* | 2/2011 | Carlson | .................. | G06Q 30/06 705/44 |
| 2011/0099037 A1 | 4/2011 | Levin et al. | | |
| 2011/0238476 A1 | 9/2011 | Carr et al. | | |
| 2011/0295988 A1* | 12/2011 | Le Jouan | ................ | G06F 21/31 709/223 |
| 2012/0215693 A1* | 8/2012 | Faith | .................... | G06Q 20/027 705/44 |
| 2012/0284175 A1* | 11/2012 | Wilson | .................. | G06Q 20/10 705/39 |
| 2013/0297501 A1* | 11/2013 | Monk | .................. | G06Q 20/405 705/40 |
| 2015/0156817 A1* | 6/2015 | Paz | ........................ | H04W 8/22 455/558 |
| 2016/0048833 A1* | 2/2016 | Huxham | ............ | G06Q 20/3226 705/71 |
| 2016/0092874 A1* | 3/2016 | O'Regan | ................ | G06Q 20/40 705/44 |

FOREIGN PATENT DOCUMENTS

WO　　　　2012167941 A1　　12/2012
WO　　WO-2013163652 A2 *　10/2013　　............. G06Q 30/02

OTHER PUBLICATIONS

Written Opinion of the International Searching Authority dated Jan. 25, 2016 for corresponding International Application No. PCT/FR2015/052979, filed Nov. 4, 2015.

French Search Report and Written Opinion dated Jul. 3, 2015 for corresponding French Application No. 1461010, filed Nov. 14, 2014.

English translation of the Written Opinion of the International Searching Authority dated Apr. 3, 2017, for corresponding International Application No. PCT/FR2015/052979, filed Nov. 4, 2015.

* cited by examiner

METHOD FOR CONNECTING A MOBILE TERMINAL WITH A SERVER OF A SERVICE PROVIDER VIA AN OPERATOR PLATFORM

CROSS-REFERENCE TO RELATED APPLICATIONS

This Application is a Section 371 National Stage Application of International Application No. PCT/FR2015/052979, filed Nov. 4, 2015, which is incorporated by reference in its entirety and published as WO 2016/075390 on May 19, 2016, not in English.

GENERAL TECHNICAL FIELD

The subject of the invention is the secure management of the provision of a service delivered by a server of a service provider to a user of a mobile terminal.

It concerns more particularly a method for securely connecting a mobile terminal of a user and at least one server of a service provider by means of a platform.

PRIOR ART

Numerous online purchasing services are currently offered for the users of terminals. These online purchasing services currently assume that the user connects to a website of the service provider. In general, the user has to create a user account: the information concerning him such as his name, first name, delivery address, products purchased, etc. are then stored and reused if necessary for a subsequent purchase in order to speed up and facilitate searching for products of interest or that are relevant to the user.

By way of example, when the user repeatedly connects to the same website of a service provider, he can benefit from recommendations or promotions for products or services, these recommendations or promotions being dependent on his previous purchases made on the same website.

As far as local trade is concerned, that is to say purchases made in a physical shop, it is not possible to implement the same recommendation mechanism for the following reasons.

Professionals have set up a system of loyalty card type to date that allows their customers to be offered promotions, discounts and personalized recommendations. When the customer goes through the checkout, he can benefit from a discount on his purchases or from recommendations for the next time he is in the shop.

However, it is never possible for the recommendations to be offered before going through the checkout, when the customer is in the shop and is doing his shopping in the shop, since the customer is identified only by means of his loyalty card, and this occurs only when he goes through the checkout.

There is thus a need for a secure linking solution allowing a service provider to communicate with a given customer in a personalized manner when this customer is in the shop, and to offer the customer at least one service (product to be purchased, content to be obtained, etc., discounts, promotions, recommendations, etc.) likely to interest him, according to previous purchases made by means of a card such as a loyalty card or the like, for example.

PRESENTATION OF THE INVENTION

The present invention thus relates, according to a first aspect, to a method for linking a mobile terminal of a user and at least one server of a service provider, the method comprising the following steps:

storage, by a server of a service provider, of an identifier of a card assigned to the user by this service provider, in connection with an alias datum, itself associated with a user identifier by means of which the mobile terminal is identified on the mobile network;

storage, in association with the identifier of the card, of first data relating to at least one first transaction performed between the user and the service provider by means of the card;

setup, via the mobile network and by means of a service platform capable of obtaining the alias datum, of a communication link between the mobile terminal of the user and the service provider server, in which communication link said alias datum is used to identify the user of the mobile terminal on the server of the service provider;

sending to the mobile terminal, via said communication link, of information about at least one service provided to the user by the service provider according to the first data stored in association with the card identifier corresponding to the alias datum used for said communication link.

The linking method is based particularly on the storage of an association between, on the one hand, a card identifier defined for a card assigned to the user and, on the other hand, an alias datum, associated with a user identifier by means of which a mobile terminal of the user is identified on the mobile network. This association makes it possible to link a user who is in a shop, carrying a card, and a user carrying a mobile terminal.

At the time at which the mobile terminal of the user and the server of the service provider are linked, the alias datum is used to identify the user to the service provider. It is thus possible, on the basis of the stored data, to find the associated card identifier, and data about one or more transaction(s) performed by means of the card. The server of the service provider can therefore offer the user at least one service likely to interest him and can send these offers via the communication link set up on the basis of the alias datum.

Using his mobile terminal, the user can therefore receive these offers while he is in the shop, even before he goes to the checkout, specifically in a personalized manner since the link to his card—and therefore his previous transactions performed by means of this card—is known. In particular, the user does not need to identify himself via his card beforehand, since his identification via the alias datum is sufficient.

The alias datum is therefore used to set up a logical link between the card and the mobile terminal. The alias datum is used to identify the user vis-à-vis the service provider when the mobile terminal is being used.

The invention can be applied to numerous situations.

The card in question is a physical or virtual or electronic card, for example. The card is a loyalty card, a payment card, a promotion card or a credit card, for example. The card identifier may be encoded in a barcode, an electronic chip or a magnetic strip. The card identifier, which is present on or in the card, can be read by a suitable reader. The card is typically used for going through the checkout in a shop in order to make a payment and/or to benefit from points or advantages according to a loyalty scheme and/or to obtain the right to access a service.

In this document, the word transaction (or equally operation) is used to denote a data interchange and/or data processing performed between the service provider and a user when a service is provided: by way of example, a payment, a purchase of (a) product(s) or service(s), a request to access a service, a request to access a content or to look at such a content, sending a content, an order for products, a request for or sending of information about a product or service, etc.

The term "service" is thus intended to be interpreted broadly: the provision of a service by a service provider thus corresponds to a group comprising at least one operation performed between at least the service provider and a user. It is, by way of example, the sale of a product, the provision of access to a service or to a content, the provision of a content, the receipt or processing of an order, the implementation of a payment transaction, etc.

In one embodiment, the linking method comprises a step of receipt, by the server of the service provider, and storage, in association with the card identifier, of second data relating to a second transaction performed between the user and the service provider via said communication link.

On account of the association made between the mobile terminal and the card through the alias datum, data listing the various transactions performed for a user either by means of his card or by means of the mobile terminal when there is a connection to a service provider server can be registered in association and used in correlated fashion by the service providers.

Data, concerning the operations or transactions performed by a user when there is a connection from the mobile terminal to a service provider server, can be stored with those concerning the operations or transactions performed by this user by means of his card.

It then becomes possible to use the data, concerning the operations or transactions performed by a user by means of his card, when there is a connection from the mobile terminal to a service provider server, for example in order to offer promotions relating to purchases made previously with the card.

Conversely, it is possible to use the data, concerning the operations or transactions performed by a user during a connection from the mobile terminal to a service provider server, for an operation performed later by means of this card. By way of example, in order to benefit, when going through the checkout and presenting the card or paying by means of the card, from a discount on a product signaled to the user when there is a connection—previous to going through the checkout on this occasion—from a mobile terminal to a service provider server.

Thus, the user has the choice of using his mobile terminal for operations or transactions online or of going into the shop and presenting his card when going through the checkout: all of the operations or transactions that he will perform in this way will be able to be taken into account without distinction as regards the modus operandi.

This allows the user of the mobile terminal to benefit from a loyalty scheme without having to provide his identity to the service provider and to interact with the loyalty scheme from his mobile terminal without having to identify himself.

In one embodiment, the method comprises a step of obtainment, by the platform, of the alias datum following an identification of the mobile terminal by a network entity of the mobile network on the basis of said user identifier. The mobile terminal is identified by means of the user identifier by the mobile network, that is to say by one of the network entities of the mobile network in charge of the identification of the mobile terminals that connect or are connected to this mobile network. The platform is designed to obtain this alias datum, for example from one of these network entities. As the alias datum ensues from a user identifier that can be obtained only by network entities in charge of the identification of the mobile terminals, only an operator of this mobile network knows this alias datum. It is therefore managed securely in the mobile network.

In a particular embodiment, the platform is directly integrated in the network infrastructure of the mobile network. The result of this is that the operations performed by the platform are secure.

In one embodiment, the alias datum used for the communication link between the mobile terminal and the server of the service provider is a provider alias datum, stored for one or more service providers in association with an operator alias datum, itself associated with the user identifier.

In one embodiment, the platform, when receiving, via said communication link, a request from the mobile terminal, containing the operator alias datum and intended for a server of a service provider, replaces the operator alias datum with the provider alias datum corresponding to the service provider in question. Thus, the operator alias datum is never transmitted to an entity outside the network infrastructure of the mobile network. The alias datum is therefore a confidential datum.

In one embodiment, the platform has a list of at least one service, each service being associated with at least one geographical area of availability, the method moreover comprising the following steps:

obtainment, by the service platform, of a piece of location information for the mobile terminal, according to said location information obtained and the list of services, determination of at least one service, called an available service, associated with at least one geographical area of availability in which the mobile terminal is located, the linking step being performed for a server of a provider of a selected service from among the determined available service(s).

The use of the geolocation information of the mobile terminal allows easier identification of the service provider(s) in the shops in which the user is likely to be. Thus, if each service provider declares a geographical area of availability for each of its shops, the user will easily be able to select from among the shops situated in the vicinity the one that he is in or the one to which he actually reckons on going, specifically even if the geolocation information of the mobile terminal has limited precision as is the case, by way of example, with the geolocation information produced by the mobile terminal.

According to one embodiment, the method according to the first aspect comprises a step of transmission, to the mobile terminal of the user, following the correct input of a USSD ("Unstructured Supplementary Service Data") code by the user on his mobile terminal, of a message allowing connection of the mobile terminal to the platform.

This allows the user to simply connect to the platform without having to input a complex URL ("Uniform Resource Locator"). Moreover, as the input of such a code requires only a numerical keypad, such a step can be implemented by any type of telephone and therefore allows the method according to the invention to be used with any type of mobile terminal equipped with a keypad and a browser.

Moreover, the obtainment of a piece of information for the location area of the terminal can be triggered following the detection of a connection from the mobile terminal to the platform or by receipt of a request message transmitted by the mobile terminal in order to obtain from the platform a list of available services.

This makes it possible to automatically obtain the information for the location area of the terminal at the time of connection thereof without requesting from the latter that a message requesting available services be sent and also allows the terminal to rerequest a list of available services after its initial connection.

According to an advantageous and nonlimiting feature, the user identifier may be an identifier associated with a user identification module of the mobile terminal.

This makes it possible to guarantee that the user identifier used does indeed identify the owner of the mobile terminal.

According to one embodiment, the platform can identify a selected available service for linking by implementing the following steps:

transmission, to the mobile terminal, of a list of available services corresponding to the geographical area in which the mobile terminal is located, receipt of an identification message for the selected service among the available services, from the mobile terminal.

This makes it possible to offer the user only the services to which his area of geographical location gives him access and to simply determine the service desired by the user among the various available services.

Furthermore, the linking step can comprise the following steps implemented by the platform:

transmission, to the server of the provider of the selected service, of a request relating to the selected service comprising the alias datum associated with the mobile terminal, receipt of data relating to one or more services offered by the service provider from the server of the provider of the selected service, at least some of the data received being personalized for the user identified by the received alias datum, transmission of the data relating to the provision of said service to the mobile terminal.

This allows the platform to deliver to the mobile terminal of the user the requested service without disclosing the identity of the user to the provider of the service. Thus, the latter cannot contact the mobile terminal without going through the platform, which greatly limits the risks of unwanted enticement for the user.

The linking step can likewise comprise the transmission by the platform, to a server of the provider of the selected service, of an alphanumeric code input by the user on his mobile terminal so that said server of the service provider delivers to the user a service associated with said alphanumeric code.

This allows the user to be able to simply request a service linked to a product, for example, without having to go through a list of services. Such a code can also be input on any type of mobile terminal with a keypad, thus not excluding mobile telephones other than "smartphones" from the field of the invention.

The linking step can finally comprise at least one step implemented by means of the platform from among a step of transmission, to the mobile terminal of the user, of electronic mail or text messages from the server of the provider of the selected service and/or a step of setup of voice communications with the mobile terminal of the user.

This allows the user to receive data in formats other than pages of internet page type, these formats being able to be more suited to storing the data sent. As the transmission of these data is still performed by means of the platform, the identity of the user of the mobile terminal is not unveiled to the service provider, which allows the user to be protected against unwanted enticements.

The method according to the first aspect can furthermore comprise a step of the user being provided, by the platform, with a personal page comprising personal information such as an electronic mail address, said personal information being able to be updated by the user of the mobile terminal.

This allows the user to have control over his personal data revealed to the platform and to be able to correct them if they prove inaccurate.

Furthermore, the data interchange between the platform and a service provider server can be implemented securely by means of a virtual private network (VPN) set up between the platform and the service provider server.

This makes it possible to strengthen the security of the data interchanges between the platform and the service providers, with any device outside the network of the operator attempting to connect to a server of a service provider being rejected.

Unless indicated to the contrary, the various embodiments that have been presented can be combined among one another for the implementation of the invention.

The present invention relates, according to a second aspect, to a computer program product comprising code instructions for executing a method according to the first aspect when this program is executed by a processor.

The present invention relates, according to a third aspect, to a server of a service provider, comprising a first database for storing an identifier of a card assigned to the user by this service provider, in connection with an alias datum, associated with a user identifier by means of which the mobile terminal (1) is identified on the mobile network;

a second database for storing, in association with the card identifier, first data relating to at least one first transaction performed between the user and the service provider by means of the card;

a communication interface for:

setting up, via the mobile network and by means of a service platform capable of obtaining the alias datum, a communication link (E4) between the mobile terminal (1) of the user and the service provider server, in which communication link said alias datum is used to identify the user of the mobile terminal on the server of the service provider;

sending to the mobile terminal, via said communication link, information about at least one service provided to the user by the service provider according to the first data stored in association with the card identifier corresponding to the alias datum used for said communication link.

Such a computer program product and platform have the same advantages as those outlined for the method according to the first aspect.

PRESENTATION OF THE FIGURES

Other features and advantages will emerge on reading the description that follows. This description is given with reference to the appended drawings, in which.

DETAILED DESCRIPTION

Figure 1:
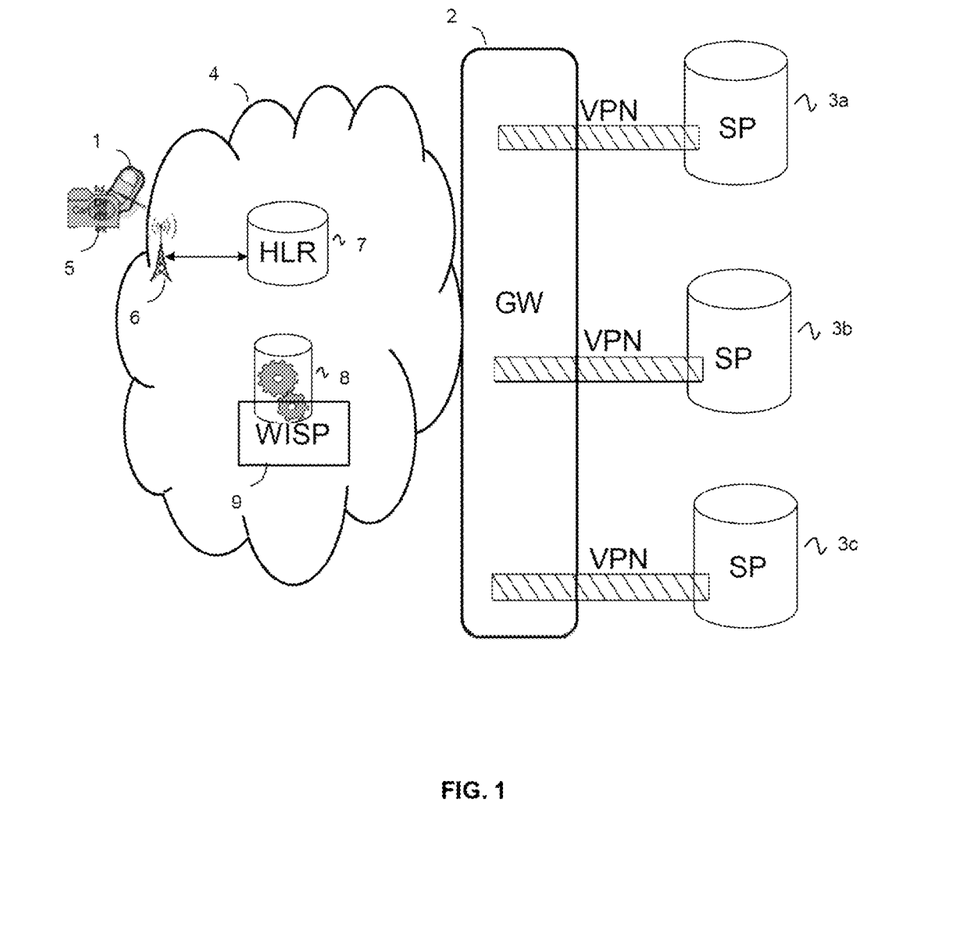
FIG. 1 schematically illustrates hardware means for a possible implementation for the invention.

With reference to FIG. 1, an implementation for the invention concerns a method for linking a mobile terminal 1 of a user to at least one server 3a, 3b, 3c . . . of a service provider by means of a platform 2 capable of being connected to a mobile network 4 managed by an operator.

The mobile terminal 1 is capable of being connected to the mobile network 4 and comprises a secure element 5. A secure element 5 of this kind is capable of storing secured data in a memory, and can consist, by way of example, of a chip card having a microprocessor connected by a data bus to a random access memory and to a rewritable nonvolatile memory such as a flash memory or an EEPROM memory and storing in its nonvolatile memory, in a secure manner, data and applications executable by said microprocessor. The secure element is typically a SIM ("Subscriber Identity Module") card, which is often called a "subscriber identity module", referred to as "user identity module" in this document.

When there is a connection to the mobile network, the mobile terminal is identified by the mobile network by means of at least one user identifier.

This user identifier is an identifier associated with the secure element 5, for example the subscriber identifier (IMSI, "International Mobile Subscriber Identity", number) and/or the telephone number (MSISDN, "Mobile Station Integrated Service Digital Network Number", number). Such a user identifier is unique and is also used as an identifier for the user identification module.

In this respect, in this document, the notion of the user identifier equally represents:

a user, as a physical person, a subscriber to a customer account with a mobile network operator (be it a customer account with or without subscription, with or without a prepaid account, etc.) and a user, as a mobile terminal, connected to the mobile network, identified and distinguished from the other connected mobile terminals by means of the user identification module accommodated in this terminal.

The user, a physical person, who has subscribed to a customer account with a mobile network operator is recognized by means of such a user identifier as an a priori user of the mobile terminal through the user identification module accommodated in the mobile terminal used, whoever the physical person actually using this mobile terminal and whatever the mobile terminal in which the user identification module is accommodated.

The method described below is implemented by the platform 2 and allows a geolocalized service to be delivered securely to the mobile terminal 1 by a server of a service provider 3a, 3b, 3c.

To do this, the platform 2 positions itself as an intermediary between the mobile terminal 1 and the servers 3a, 3b, 3c in order to mask the real identity of the user of the mobile terminal, as a physical person. The latter is identified to the servers 3a, 3b, 3c only by an alias, called an alias datum here. The correspondence between this alias datum and the real identity of the user of the mobile terminal remains unknown to the servers 3a, 3b, 3c, which never enter into direct communication with the mobile terminal 1. Moreover, the alias data cannot be used in another context or by another entity in the network. The use of such an alias datum for identifying the user of the mobile terminal by the service provider servers also makes it possible to prevent the user of the mobile terminal from having to input an identifier and a password in order to identify himself to the servers.

The mobile terminal 1 of the user can consist in a mobile telephone, a "smartphone", a tablet, a gaming console, a portable computer, a PDA ("Personal Digital Assistant") or any other mobile terminal equipped with a secure element 5 of this kind and with wireless communication means allowing it to access the mobile network 4. The mobile terminal 1 may be a mobile telephone of any type, equipped with or without a large screen, a GPS chip, touch-sensitive input means. The mobile terminal 1 includes at least one software application, such as a browser, that is capable of displaying a page of internet page type such as an HTML or PHP page or more generally of setting up a communication link to a remote server. Thus, a mobile terminal 1 of this kind is not necessarily a "smartphone".

The mobile network 4 can consist in a mobile telephony network of GSM, GPRS, UMTS, LTE, etc. type. Communications on this network may be secure, particularly by virtue of encryption of the interchanged data. By way of example, the mobile telephony network shown in FIG. 1 is a mobile network of GSM type that comprises network entities adapted to carrying out identification of a mobile terminal on the basis of a user identifier.

In particular, the mobile network comprises a base station (BTS) 6 connected to the mobile terminal 1 and at least one geographical location register for the subscribers (HLR or "Home Location Register") 7. The HLR consists in a central database of the mobile network operator, having the information relating to any user authorized to use this network and particularly his location in the network. The HLR particularly contains the following information characterizing the user himself: the IMSI ("International Mobile Subscriber Identity"), a unique identity for the user that is also entered on the SIM card, the IMEI ("International Mobile Equipment Identity") defining the mobile station used, or generally, the mobile telephone of the user, the MSISDN indicating the international telephone number on which the user can be reached, etc.

Generation of the Alias Datum

The mobile network also comprises a processing module 8 allowing storage and management of an alias datum in association with at least one user identifier, or even generation of this alias datum from at least one user identifier associated with the secure element 5 such as the IMSI and/or the MSDISDN provided by the HLR 7.

Such a processing module 8 may be included in a WISP 9 ("Wireless internet Service Provider") or be connected to a WISP 9. The processing module 8 and the WISP will be merged below. This alias datum can result from any transformation of this user identifier or of these user identifiers, for example a transformation by application of a hash function. The transformation function is chosen such that the alias datum obtained by transformation is unique and permanent, thus allowing unambiguous identification, by the platform 2, of the physical person subscribing to the customer account and also at the mobile terminal of the user. This alias datum is used as a unique identifier for the user of the mobile terminal 1 to the servers 3a, 3b, 3c of the service providers.

The alias datum can be generated at the time of production and/or configuration of the user identification module, or when a mobile terminal integrating this user identification module is first connected to the mobile network of the operator. The alias datum generated is stored in association with a user identifier in a database specific to the operator. The alias datum is permanent and does not change on the subsequent connections to the mobile network. The alias datum is thus used as an anonymized identifier for the mobile terminal and/or for the user of this mobile terminal and/or for the subscriber identification module of this terminal.

On setup of a connection from the mobile terminal to the mobile network, the user identifier is determined by a network entity of the mobile network and the alias datum is determined by the network entity of the mobile network, which stores this operator alias datum in association with the user identifier. The alias datum is then transmitted to the platform for the purpose of linking a service provider server and a mobile terminal.

The platform 2 is thus designed to obtain this alias datum, on setup of a connection between the mobile terminal and the platform via the mobile network, and to transmit this alias datum to at least one of the servers 3a, 3b, 3c of the service providers.

Figure 2:
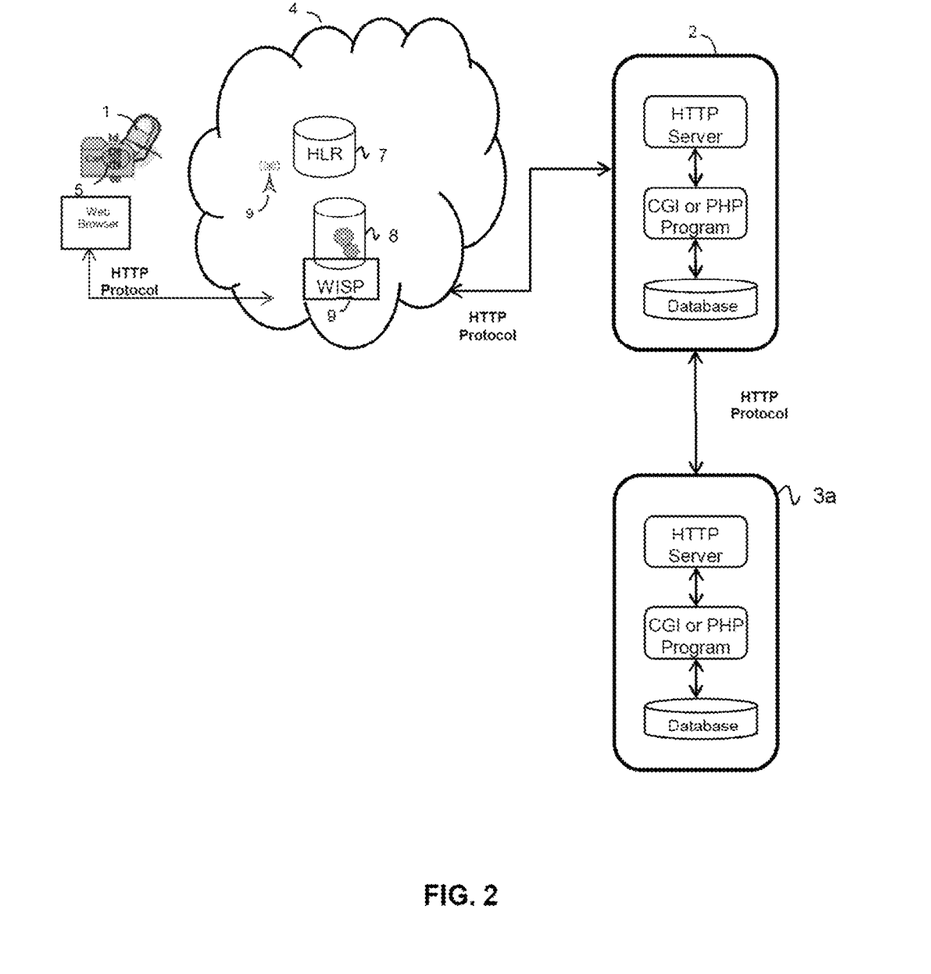
FIG. 2 schematically illustrates hardware means for a possible implementation for the invention according to which the communications use the HTTP protocol.

An embodiment using the HTTP (Hypertext Transfer Protocol) protocol is described below and illustrated with reference to FIGS. 2 and 5.

The mobile terminal sets up a web connection for connecting the mobile terminal to the platform. By way of example, a first HTTP request is sent by the terminal containing the URL ("Uniform Resource Locator") corresponding to the platform: http://urlp/, where 'urlp' is the web domain managed by the platform. This first HTTP request is received by the WISP. The URL received is enriched by the WISP by inserting the alias datum ('aa') and a piece of location area information 'xy' into said URL. The enriched URL is then in the form http://urlp/aa/xy/, for example. The platform then receives the first HTTP request containing the enriched URL, and extracts the alias and the location area information therefrom. The platform thus does not know the user identifier(s) used for generating the alias datum.

Next, according to the location area information of the mobile terminal, the platform will either send the mobile terminal a list of available servers (if there is more than one server associated with the location area) by returning a list of possible URLs corresponding to the various servers, or directly route the first HTTP request to the only available server.

When the platform directly routes the first HTTP request to the only available server, it adds the web domain 'ur13a' managed by the available server and first removes the location area information from the URL: http://urlp/ur13a/aa/.

When the platform returns a list of URLs to the terminal, these URLs are in the form
http://urlp/ur13a
http://urlp/ur13b
http://urlp/ur13c
where ur13a, ur13b, ur13c are the web domains managed by the servers 3a, 3b, 3c, respectively. A second HTTP request is sent to the platform by using one of these URLs. Again, the WISP intercepts this HTTP request and inserts the alias datum 'aa' and a piece of location area information 'xy' into said HTTP request: http://urlp/ur13a/aa/xy, for example. Next, the platform routes the second HTTP request to the server in question, following possible removal of the location area information from the URL: http://urlp/ur13a/aa/.

The HTTP request enrichment mechanism that has just been described will be used for all requests transmitted by the mobile terminal to the platform.

Double Alias

In one embodiment, not one alias datum but two alias data are used:

the first alias datum, called the operator alias datum, is a permanent alias datum: this first alias datum is stored, as described above, in association with the user identifier by a network entity of the mobile network (the WISP, for example);

the second alias datum, or provider alias datum, is a temporary alias datum, modifiable at the request of the user or of a service provider or of the platform: this second alias datum is stored in association with the card identifier by a server of one or more service providers.

In this embodiment, the platform stores, in association, the operator alias datum in association with one or more provider alias data. For each provider alias datum, the platform moreover stores an identification for the service provider(s) for which this provider alias datum is to be used.

While the provider alias datum is specific to one or more service providers, the operator alias datum is common to all service providers. The service provider servers do not know this operator alias datum, however, which is stored only by the platform and the network entity of the mobile network (the WISP).

On setup of a connection from the mobile terminal to the mobile network, the user identifier is determined by a network entity of the mobile network and the operator alias datum is determined by the network entity of the mobile network, which stores this operator alias datum in association with the user identifier. The operator alias datum is then transmitted to the platform for the purpose of linking a service provider server and a mobile terminal.

Next, on linking of a service provider server and a mobile terminal, the operator alias datum is replaced, by the platform, by the provider alias datum that is stored in association with an identification for the service provider for which the linking is to be performed.

A first advantage of the double alias solution lies in the fact that the operator alias datum is never transmitted to a service provider server: it is known only to the platform 2 and to the network entity that stores it. Spoofing this operator alias datum is therefore much more difficult.

A second advantage of the double alias solution lies in the fact that the provider alias datum can be modified at any time, without affecting the linking and the data interchange mechanism between the user and the service providers. This provides the service provider with more flexibility for offering a way in which the user can regain his anonymity.

Specifically, by using a single alias datum, the anonymity of the user does not actually exist if the service provider has furthermore stored personal information (name, first name, address, telephone, etc.) in association with the card identifier, as is often the case for (personalized and/or non-anonymous) loyalty cards.

In the double alias embodiment, the user has the ability, by way of example, to connect to the platform and/or to the server of the service provider in order to request:

deletion of the provider alias datum for one or more service provider(s);

provision or requesting of a new provider alias datum to be used for future transactions and requesting of storage thereof in association with his card identifier;

optionally, deletion of the history of the transaction data stored in association with his card identifier;

or even deletion of the personal information stored in association with the card identifier in order to completely regain his anonymity; this will be possible only if the service provider can manage an anonymous card, without associated personal information.

In the double alias embodiment, the alias datum used in the steps of the linking method is either the provider alias datum for the interchanges between the platform and a service provider server, or the operator alias datum at the time of the interchanges between the platform and a network entity, particularly the WISP.

The platform, which is used as a communication intermediary between the mobile terminal of the user and a service provider server, therefore replaces the operator alias datum with the provider alias datum corresponding to the service provider in question when it receives a request from the mobile terminal before transferring this request to the server of the service provider. Thus, in the example given further above, the datum 'aa' encoded in the URL transmitted to the server of the service provider http://urlp/ur13a/aa/xy will be the provider alias datum rather than the operator alias datum.

Conversely, the platform replaces the provider alias datum with the operator alias datum when it receives a request from a server of a service provider before transferring this request to the mobile terminal.

To simplify reading, the remainder of the description will be written assuming that a single alias datum is used.

Servers of the Service Providers 3a, 3b, 3c

The servers of the service providers 3a, 3b, 3c comprise a random access memory and storage means such as a rewritable nonvolatile memory (flash memory or EEPROM memory) that can store at least one database and data processing means having a data processor for executing a computer program comprising program instructions for implementing the steps of the method for linking to a terminal.

Said servers also comprise a communication interface for setting up a communication link to the platform 2 and to a terminal via the platform, of wired type such as an Ethernet link, or of wireless type such as a Wifi or Bluetooth connection. Such servers can also be connected by means of a USB, Ethernet, Firewire, eSata, etc. connection to an external storage device such as an external hard disk or a networked hard disk ("NAS"). Such a server is dedicated to providing a service to a user by means of a mobile site intended to be displayed by the browser of the mobile terminal 1 of the user. Such an online service can be provided by the service provider on behalf of a physical establishment such as a shop, museum, an exhibition center, etc.

Card and Storage of Transaction Data

The servers of the service providers 3a, 3b, 3c comprise or access a first database in order to store, for users benefiting from a card, an identifier for a card assigned to the user by this service provider, in connection with an alias datum, associated with a user identifier by means of which the mobile terminal is identified by the operator of the mobile network.

The servers of the service providers 3a, 3b, 3c comprise or access at least one second database in order to store, in association with the card identifier, first data, called first transaction data, relating to one or more transaction(s) performed between the user and the service provider by means of the card.

The transaction is, by way of example, a product purchase with presentation of the card when going through the checkout. These first transaction data comprise, by way of example, a transaction total, an identification for at least one product or service provided by the service provider to the user when executing these transactions. They may, by way of example, be data that are usually present on a till receipt, data from an invoice, etc.

These first data are generated by also when the user goes through the checkout, at the time of payment, and transmitted to the second database for storage by the equipment (the till, in this case) that generates them.

These first transaction data allow the server of the service provider to make recommendations to the user regarding products that are likely to interest him and thus to speed up and facilitate identification of products of interest to the user.

Figure 3:
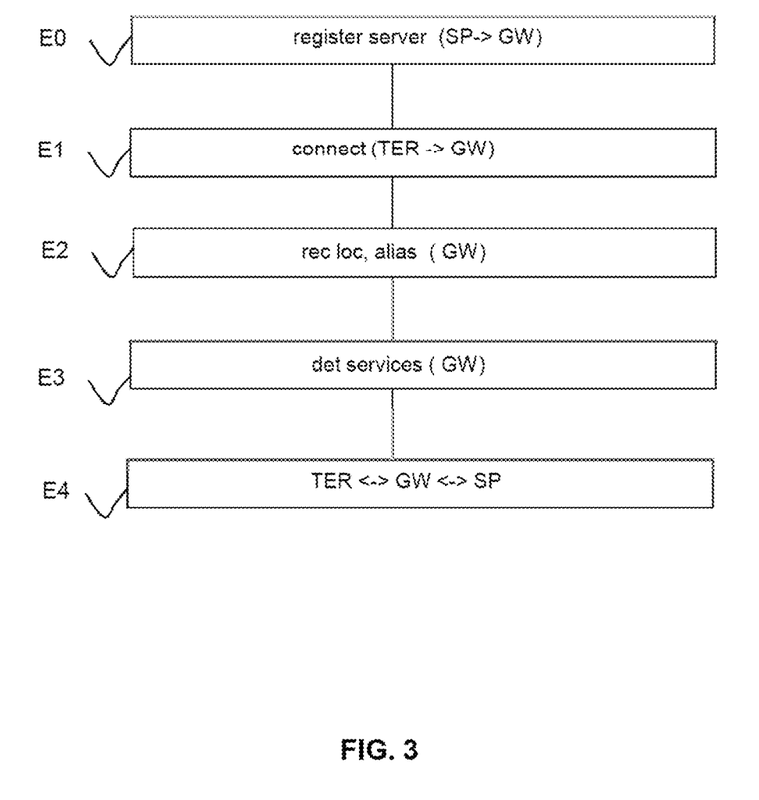
FIG. 3 is a chart mapping an example of implementation of a linking method according to a way of implementing the invention.

Storage of these first transaction data is performed by the service provider server in question before, after or in parallel with any one of steps E0 to E4, during which a communication link is set up, by the mobile network, by means of the platform 2, between the mobile terminal of the user and the service provider server in question in order to link the user and the service provider.

The servers of the service providers 3a, 3b, 3c are moreover configured to store in a database, for example in the second database, in association with the card identifier, second data, called second transaction data, relating to one or more transaction(s) performed between the user and the service provider through a communication link that is set up, by the mobile network, by means of the platform 2, between the mobile terminal of the user and the service provider server in question.

Thus, if, by way of example, the user makes product purchases or requests or performs any other transaction, promotion code selection or the like, the second corresponding transaction data will be stored: identification of the products, transaction total, promotion code, etc.

Storage of these second transaction data is performed in step E4, following the setup, via the mobile network, by means of the platform 2, of a communication link between the mobile terminal of the user and the service provider server in question.

As already indicated by way of introduction, each service provider server can thus use, in correlated fashion, first transaction data stored for transactions performed by means of the card and second transaction data stored for transactions performed via the communication link that has been set up. In particular, all of the transaction data thus stored can be used to generate recommendations, that is to say information about at least one service offered to the user by the service provider.

The servers of the service providers 3a, 3b, 3c may moreover comprise a third database in order to store personal information about the user (name, first name, address, telephone, etc.) in association with the card identifier that is assigned to this user.

The various databases may or may not be hosted in one and the same piece of physical equipment.

The platform 2 can comprise a proxy server, storage means such as a rewritable nonvolatile memory (flash memory or EEPROM memory) that can store at least one database and processing means having a processor. Said platform 2 can also comprise interface means, of wired type such as an Ethernet link, or of wireless type such as a Wifi or Bluetooth connection allowing it to connect firstly to said mobile network and secondly to the servers 3a, 3b, 3c . . . of the service providers.

Virtual private networks (VPN) can be set up between the platform 2 and each server 3a, 3b, 3c . . . of a service provider. Virtual private networks of this kind can be seen as an extension of local area networks and allow preservation of the logical security that there may be within a local area network. They actually correspond to an interconnection of local area networks via a "tunnel" technique allowing the data transmitted to be rendered secure, through the implementation of cryptographic algorithms. Thus, the service providers can reject all communication from an entity other than the platform and are inaccessible to search engines and internet robots, as well as to pirates that might attempt to connect thereto. The security of data interchanges between the platform and the servers of the service providers is thus greatly improved.

According to one way of implementing the invention, communications between the mobile terminal 1, the mobile network 4, the platform 2 and the servers of the service providers 3a, 3b, 3c use the http protocol. The hardware means corresponding to such an implementation of the invention are shown in FIG. 2.

To allow a user to access a geolocalized service delivered by a service provider while rendering interchanges secure, the method of secure interchanges can be implemented in multiple phases: a phase of registration of the servers of the service providers with the platform, a phase of connection of the mobile terminal to the platform, a phase of obtaining information relating to the mobile terminal, a phase of user accessibility of the available services and a phase of delivery of a service provided by a service provider to the mobile terminal.

Registration of the Servers with the Platform

In a preparatory step E0, referring to FIG. 3, each service provider registers its server 3a, 3b, 3c on the platform 2 so that the geolocalized services that it offers can be delivered by it to the mobile terminal 1. For this, each service provider indicates a physical address characterizing the geographical location of its physical establishment in proximity to which it wishes to provide a geolocalized service. In a nonlimiting embodiment, the physical address can correspond to the geographical center of a service activity without the service provider necessarily having a physical establishment at said address.

One and the same service provider can register multiple geographically remote physical establishments or multiple geographically remote service activities.

The service provider can also provide a piece of information such as a maximum distance for provision of a service in relation to the indicated geographical location, allowing the platform 2 to determine a geographical area of availability in which said service can be provided to a user of a mobile terminal 1. In the absence of provision of such a piece of information, a geographical area corresponding to a disk centered on the indicated geographical location and having a default value as a radius can be kept.

A geographical area of this kind cannot go beyond the territory covered by the operator of the mobile network 4.

At the conclusion of this preparatory step E0, the platform 2 has a list of services for which service providers have registered a server, each service being associated with at least one geographical area of availability. These data can be stored in the form of a database registered in the storage means of the platform or in a remote database accessible by the platform.

Thus, each service provider can delimit the geographical area(s) in which it authorizes the user of a mobile terminal to receive a service. The service provider can then offer a service adapted to this geographical location. A geographical area can correspond to one or more location cells managed by the operator of the mobile network. The extent of the geographical area is thus variable and dependent on the maximum range of the BTS of the cell(s) corresponding to the defined geographical area.

Connection of the Mobile Terminal to the Platform

In a first step E1, the user of the mobile terminal 1 requests connection thereof to the platform 2.

According to a first variant, the user accomplishes this by using the browser of his mobile terminal 1 to input a network address such as an IP address or an http address allowing connection to the platform 2. This address can then be added to favorites.

According to a second variant illustrated in FIGS. 4a to 4d, a unique USSD ("Unstructured Supplementary Service Data") code 10, for example, #100#, may have been defined in order to facilitate the connection of the mobile terminal 1 to the platform 2. The user can then input the USSD code on the keypad of his mobile terminal 1 and receive a message in response allowing him to connect to the platform, such as an SMS message 12 whose body contains the address of the platform 2. Such an SMS can be replaced by any type of message processed by the operator of the mobile network 4, for example an MMS.

The address that is input is sent to the WISP 9 of the network of the operator.

The WISP 9 authorizes only access by mobile terminals 1 that are recognized on the mobile network 4, that is to say for which a user identifier can be obtained, for example by interrogating the user identification module 5. Any attempt at connection by a terminal that does not have a user identification module, or that attempts to connect from networks other than the internet, is rejected by the WISP.

Obtainment of Information Relating to the Mobile Terminal by the Platform

In a second step E2, the WISP 9 transmits the connection request from the mobile terminal 1 to the platform 2, accompanied by a piece of location information for the mobile terminal 1 of the user and by the alias datum identifying the user of the mobile terminal 1. The WISP 9 can obtain this information by interrogating equipment of the mobile network of the operator, such as the HLR 7 and the processing module 8. In the particular case of the double alias embodiment, it is the operator alias datum which is transmitted to the platform 2 in step E2.

At the time of such interrogation, the WISP can provide an identifier for the mobile terminal: for example a user identifier contained in the user identification module of the mobile terminal requesting a connection to the platform 2. The platform does not need to interrogate the mobile terminal in order to obtain a piece of location information for the mobile terminal 1.

The WISP 9 can also transmit the identifier of the operator of the mobile network 4 to the platform 2.

Figure 5:
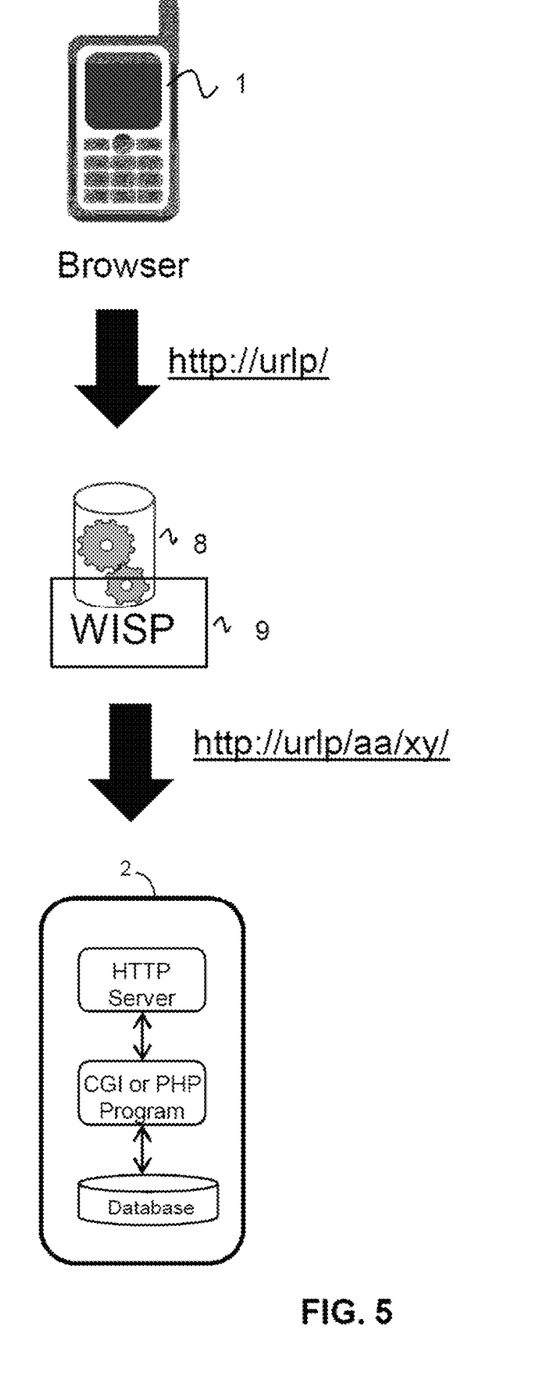
FIG. 5 illustrates an example of transmission of the alias and of the geographical coordinates of the mobile terminal to the platform.

This information can be transmitted to the platform 2 by the WISP (Wireless internet Service Provider) of the mobile network 4 in the form of a url such as an http link, as illustrated in FIG. 5.

No consent for the transmission of geolocation data on the part of the user of the mobile terminal 1 is required since the platform 2 is part of the equipment of the operator.

According to a first variant, this second step is triggered following the request for connection of the mobile terminal 1 to the platform 2 in the first step E1.

According to a second variant, this second step can be triggered later by virtue of the mobile terminal 1 sending the platform 2 a request message in order to obtain a list of available services. Such a message can, by way of example, be sent by the mobile terminal 1 after receiving a first service in order to determine what the other available services are. The initial connection of the mobile terminal 1 to the platform 2 has then already taken place for some time.

User Accessibility of Available Services

In a third step E3, the platform 2 determines, according to said location information obtained in the second step E2 and the list of services that is stored at the conclusion of step E0, the services, called available services, that are associated with at least one geographical area of availability in which the mobile terminal of the user is located. These available services are those for which the geographical location of the mobile terminal 1 will give it the right to access. The list of services is presented, by way of example, in the form of a list of shops referenced for the determined geographical area of availability.

If the platform 2 identifies that no service is available for the user, it sends back to the mobile terminal 1 a page indicating that no service is available in the geographical area that the user is in.

If the platform 2 determines that a single service is available for the user, this service can automatically be chosen by the platform 2 as the selected service that the user will access in the following step.

Figure 4A:
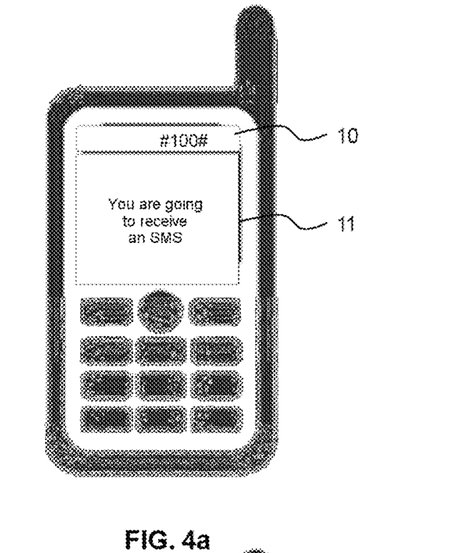
FIGS. 4a, 4b, 4c, 4d illustrate an example of access, by a user of a mobile terminal, to an available service with input of a USSD code according to a way of implementing the invention.
Figure 4B:
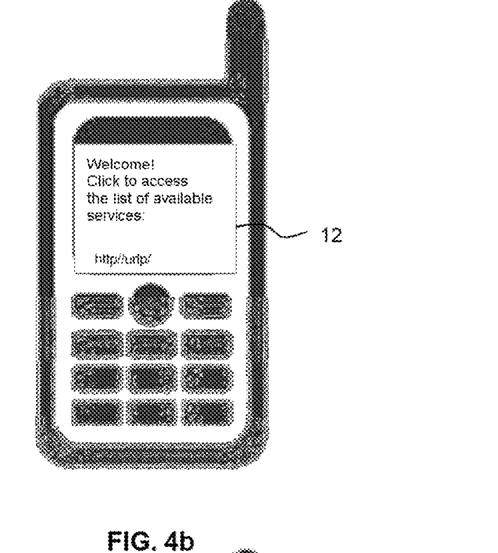
Figure 4C:
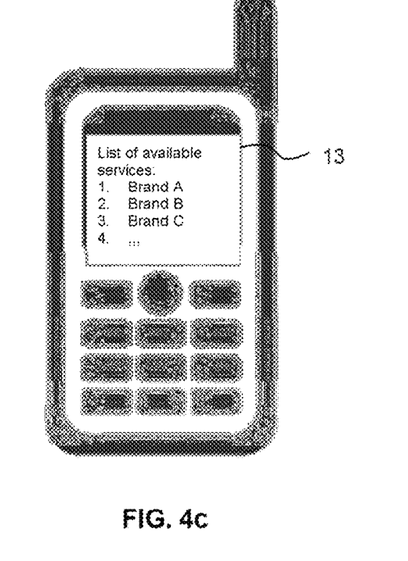

If the platform 2 determines that at least two services are available for the user, it transmits to the mobile terminal 1 a page containing a list of available services 13 in the geographical area of the user. This list is advantageously classified by ascending order of distance between the geographical location area of the mobile terminal 1 and the geographical location of the physical establishment associated with the service as illustrated in FIG. 4c.

According to one variant, the platform 2 also sends back a page containing a list when it determines that a single service is available for the user.

To send messages to the mobile terminal, such as pages comprising lists of available services, for example, the platform can send these messages to the WISP accompanied by the alias datum used to identify the recipient of the message.

When multiple services are accessible, one service is selected in the transmitted list.

In a first variant, the user himself selects a service from the list displayed on the mobile terminal. A message identifying the selected service among the available services is then transmitted from the mobile terminal 1 to the WISP. The WISP retransmits this message to the platform after it has added thereto the information of the location area of the mobile terminal and the alias datum identifying the user of the mobile terminal. This information can be transmitted by the WISP to the platform in the form of a URL such as an http address.

In a second variant, a selection rule for a service is applied so as to carry out automatic selection of a service. The selection rule is based, by way of example, on criteria such as: proximity between the geographic location of the connection area of the mobile terminal and the geographical location associated with the service, order of preference defined between the services, novelty of the service, type of service (cinema, restaurant, supermarket, etc.) or the like. In this variant, it is the platform 2 that identifies at least one selected service among the available services determined by applying a selection rule. A confirmation can be requested from the user.

Following this identification of the selected service, the platform 2 identifies the service provider FS1 in question, which is capable of providing the selected service.

The platform 2 can then send the mobile terminal 1 data relating to the service provider in question FS1 and/or relating to one or more services offered by this service provider FS1. By way of example, the platform 2 can send the mobile terminal 1 a page of internet page type. This page is then displayed by the browser of the mobile terminal 2 in order to deliver information to the user.

In the particular case of the double alias embodiment, the alias datum used in step E3 is the operator alias datum.

Delivery of a Service

In a fourth step E4, the platform 2 uses the alias datum of the mobile terminal 1 of the user to link, with a communication link, this terminal 1 and the server of the provider of the service 3a, 3b, 3c selected in the third step E3.

To do this, the platform 2 transmits a service request to the server of the provider of the selected service 3a, 3b, 3c. This request comprises the alias datum of the mobile terminal 1 requesting the service. This alias datum will be able to be used to identify the user to the service provider at the time of various data interchanges relating to a service or at the time of successive access to a service without the service provider having to know the real identity of the user of the mobile terminal. The service provider particularly does not know the user identifier or the MSISDN number of the mobile terminal and has no means of directly contacting the mobile terminal, which allows the user of the mobile terminal not to be enticed against his will by such service providers. In the particular case of the double alias embodiment, the alias datum used in step E4 is the provider alias datum.

Such a service request can be transmitted by the platform in the form of a url such as an http address comprising the alias datum.

Data relating to the service provider in question FS1 and/or relating to one or more services offered by this service provider FS1 are then sent by the server of the service provider 3a, 3b, 3c to the platform 2. At least some of the data sent can be personalized for the user identified by the received alias datum.

These data comprise information about at least one service offered to the user by the service provider in question FS, the service(s) offered being determined according to first transaction data stored in association with the card identifier corresponding to the alias datum used for the communication link. This information is, by way of example, recommendations for products that are based on product purchases made previously for which the first transaction data have been stored.

The platform 2 retransmits these data to the WISP of the network of the operator, which, knowing the correspondence between the alias datum of the mobile terminal 1 and its user identifier, transmits these very data to the mobile terminal 1.

The data sent by the service provider to the platform 2 for the mobile terminal 1 advantageously consist in pages of internet page type that are intended to be displayed by the browser of the mobile terminal 1.

The orders that can be input by the mobile terminal 1 during access to the service, such as clicking on a link or a button in a page sent by the service provider, are sent by the mobile terminal 1 to the WISP. The latter retransmits them to the platform by replacing any identity information of the mobile terminal 1 with the alias datum generated by the processing module 8 for the mobile terminal 1. The platform then retransmits these orders accompanied by the alias datum to the server of the service provider.

Figure 4D:
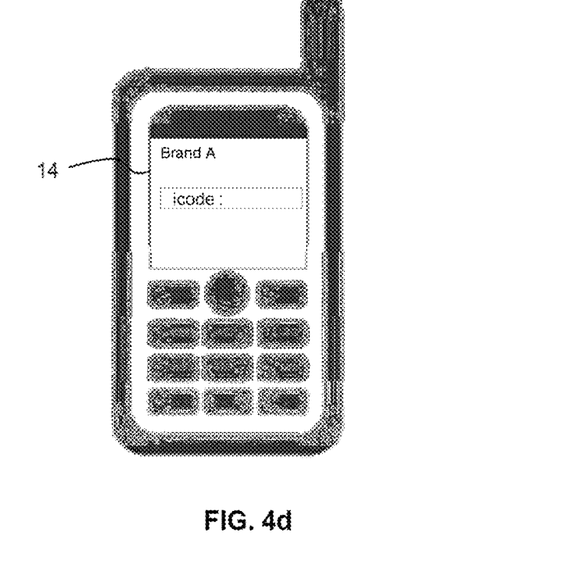

As illustrated in FIG. 4d, the user of the mobile terminal 1 can input an alphanumeric code on his mobile terminal 1, for example in an input field 14 of a page sent by a server of the service provider 3a, 3b, 3c, in order to request delivery, by this server, of a service associated with this code, once the latter has been retransmitted by the platform to the server of the service provider 3a, 3b, 3c.

The filtering of the available services that is performed by the platform according to the geographical location of the mobile terminal 1 in the third step E3 and the anonymization of the data communicated to the service provider by virtue of the use of aliases in the fourth step E4 allow the service provider to deliver a geolocalized service to the user of the mobile terminal while guaranteeing the confidentiality of the identity of the user of the mobile terminal 1 and of his geographical location, since these data are never transmitted to the service provider. Furthermore, as the data of the location area of the mobile terminal 1 are never transmitted outside equipment of the operator, no authorization for transmission of these data needs to be requested from the user.

Direct Access to a Server

The user wishing to access a service that he already knows to exist and whose mobile terminal 1 is already connected to the platform 2 can use his mobile terminal 1 to send the platform 2, via the WISP 9, a request to provide said service. The WISP adds to this request a piece of location information for the mobile terminal and an alias datum identifying the user of the mobile terminal before retransmitting this request to the platform, as in the third step E3.

On receiving such a request, the platform 2 determines whether the geographical location of the mobile terminal 1 gives it the right to access the requested service, that is to say whether its geographical location area is in a geographical area of availability of the requested service.

If this is indeed the case, the fourth step E4 is performed in order to provide the requested service to the mobile terminal. Otherwise, the mobile terminal 1 is denied access to the service and the platform 2 sends it a page indicating this denial of access and offering it a list of available services for its geographical location area.

Rerouting of Services

The platform 2 can also link the server of the service provider 3a, 3b, 3c to the mobile terminal 1 of the user in order to provide service data other than pages of internet page type. It can transmit such service data accompanied by an alias datum identifying their recipient to the WISP, which, due to its knowledge of the correspondence between the alias datum and the user identifier of the mobile terminal 1, can transmit such data to the mobile terminal 1 on behalf of a server of a service provider 3a, 3b, 3c. The mobile terminal can thus find itself transmitting messages of SMS or MMS type. By way of example, interchanges of such data between a server of a service provider, the platform and the WISP can be effected via the FTP protocol or the SNPP protocol, for example.

According to one variant, the platform 2 can transfer a request to send an electronic message such as an email on behalf of a service provider 3a, 3b, 3c, accompanied by the alias datum, to the WISP, which will undertake to transmit the electronic message to the recipient due to its knowledge of the correspondence between the alias datum and the user identifier of the mobile terminal.

According to another variant, the platform 2 can also set up a voice communication between the mobile terminal 1 identified by a first alias datum and a server of a service provider 3a, 3b, 3c or another mobile terminal identified by a second alias datum, following a voice link request transmitted by a server of a service provider. If the two alias data belong to a single operator, the platform transmits the voice link request accompanied by the two alias data to the single operator in question, which then undertakes to set up the voice communication between the caller and the called party.

If the two alias data belong to two different operators, the platform transmits the voice link request of the called party accompanied by its alias to the operator in question, and in return the latter returns a temporary telephone number to the platform. The platform then transmits the second alias of the caller and the temporary telephone number to the second operator, which undertakes to set up the voice communication between the caller and the called party.

So that the user of the mobile terminal 1 does not massively receive unsolicited messages or calls, the platform 2 can provide the user with a personal administrative internet page to which the user can connect from his mobile terminal 1 in order to check personal information such as his electronic mail (email) address, and to correct this information if necessary. Optionally, the user can also specify on this page whether he agrees to receive messages from the service providers by SMS, email or voice communication, and can also specify a maximum number of messages that he agrees to receive by these means over a given period, for example a week or a month.

Such an internet page is accessible from the mobile terminal 1 by connecting to the address of the public site of the platform. At the time of processing of a request for connection to this page by the network of the operator, the WISP adds to the url of this page the alias datum identifying the user of the mobile terminal. When a mobile terminal is first connected to this page, the platform creates a personal administrative space linked to the alias datum of the mobile terminal. On all subsequent connections, the platform will automatically give access to this personal space to the user of the mobile terminal without the user needing to provide an identifier or a password.

As a variant, such a page is an internet page accessible from any device connected to the internet network. In order to be able to identify the personal space that he seeks to access, the user sends an SMS from his mobile terminal containing a keyword particular to a predefined number. When this SMS is sent to the platform, the operator replaces the number of the transmitter with the alias of the mobile terminal. On receiving the SMS, the platform transmits an identification code to the mobile terminal identified by its alias. This code can be delivered to the mobile terminal in the form of an SMS using the process described above. Input of the identification code by the user on the internet page of the platform then allows said user to access the administrative space linked to his mobile terminal.

Movements by the Terminal During Access to a Service

The geographical location of the area of the mobile terminal 1 is determined a first time after the request for connection of the mobile terminal to the platform 2 and then when a service is selected from among the available services. If the mobile terminal leaves the geographical area associated with a group of services while data relating to one of these services are in the process of being delivered to said mobile terminal by a server of the service provider, transmission of these data to the mobile terminal will be interrupted.

If the mobile terminal 1 has moved since the moment it was connected to the platform and the mobile terminal 1 has entered a new geographical area providing access to one or more other services, a request to refresh the list of accessible services can be triggered from the mobile terminal, for example, at the request of the user of this mobile terminal or automatically by the platform, which records that a request has been transmitted by the mobile terminal located outside the located area of the service provider. In both cases, an updated list of accessible services, dependent on the new location of the mobile terminal, will be transmitted to the mobile terminal for display on the mobile terminal.

Applications

The method can be used to offer the customer of a physical business chain a paperless loyalty scheme. The user of a mobile terminal 1 entering a shop can then use his mobile terminal 1 to connect to the platform and request access to the "loyalty scheme" service of the shop.

The server 3a, 3b, 3c of the provider of the "loyalty scheme" service then identifies the user of the mobile terminal 1 by his alias datum and returns data to him, at least some of which can be made up of personalized data for the user identified by the alias datum used. By way of example, the user of the mobile terminal can thus access a page corresponding to his personal space and providing him with access to various information such as discount coupons, his personal promotions, his loyalty points, etc. The server of the service provider 3a, 3b, 3c can then provide the user with a service specific to his location, for example specific to the shop that he is in if this shop is part of a chain of shops, without having to know the real identity of the user of the mobile terminal, since the latter is identified only by its alias datum.

In as much as the user identifier used for generating the alias datum is permanent and therefore invariable for a given user identification module (this is not a dynamically allocated identifier, for example), the alias datum is itself permanent and invariable. Thus, monitoring, over time, of the various connections made for a user on the servers 3a, 3b, 3c of the service providers will be able to be carried out by these servers, for example with the aim of making recommendations for the user, according to the customs of the user and/or the choices made by this user when loading pages, and therefore when looking at offers of products and/or services. Thus, at least some of the data transmitted to the mobile terminal can be made up of personalized data, managed specifically for the user identified by the alias datum used at the time of the connection, for example recommendations for the products or services, personalized promotions dependent on previous purchases and previously purchased product quotas, etc.

Thus, the user of the mobile terminal 1 can easily associate a discount coupon with his loyalty account using his mobile terminal. This is because, once connected to the server of the service provider corresponding to the shop, it suffices for him to use a dedicated field of the page of the service provider to input an alphanumeric code corresponding to a discount coupon, for example the promotional barcode for a product, so that the latter is added to his loyalty account.

To implement such management of promotional coupons, called "couponing", the server can have a database associating at least two data from among the identification code for at least one product, the identification code for a promotion on at least one product, the identification code for the loyalty card or for a financial card of the user of the mobile terminal, the identification code for the card specific to the couponing of the user of the mobile terminal, the alias datum of the mobile terminal.

Figure 6:
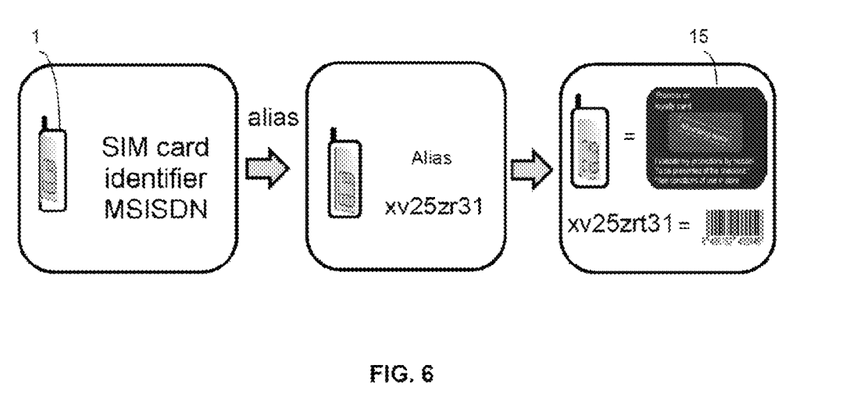
FIG. 6 illustrates the principle of the "couponing" card according to a way of implementing the invention.

The association of the alias datum with a specific "couponing" card 15 or with the loyalty card of the user allows this card to become the equivalent of the mobile terminal of the user as illustrated in FIG. 6.

To associate his "couponing" card 15 or his loyalty card with the alias datum, the user can use his mobile terminal to input an identification code displayed on his "couponing" card, which is then transmitted and stored in the database of the server in association with the alias datum of the mobile terminal.

It is also possible to associate a "couponing" card 15 with alias data of multiple mobile terminals, for example so that people living as a couple can pool their promotions.

Making discount coupons paperless in this manner allows printing expenses, processing costs and finance advances to be avoided.

When going through the checkout, the user can advantageously use the registered discount coupons by presenting an identifier of his loyalty account, for example by presenting his "couponing" card or his loyalty card and by having the barcode scanned that is used to identify his "couponing" card or his loyalty card.

The server can then identify the mobile terminal using the alias datum of the mobile terminal stored in connection with the identification code of his "couponing" or loyalty card, to determine all of the promotions from which the user benefits for all products whose barcode has been registered by the input of a corresponding or scanned alphanumeric code and directly deduct all of these promotions from the total to be paid by the user. This makes it possible to avoid scanning each coupon, checking validity dates of such coupons and filing these coupons. Management of the coupons is thus totally automated, which allows a certain time saving at the checkout. This operation is also totally transparent both for the user and for the cashier, since it only requires use of the cards in the usual way.

So that the user is able to visualize the promotions from which he benefits in their entirety, the server of the service provider on behalf of the trader can offer the user access to a personal page displaying all the promotions of the user of the mobile terminal. This page can be updated regularly allowing deletion of promotions that are obsolete or have already been used.

Within the context of the sale of products, the method can be used to provide the user with information relating to products on a shelf and can consist, by way of example, of advice to facilitate the associations of ideas, recipe ideas, advertising games, etc. For this, it suffices for the user to use the page of the shop to input an alphanumeric code corresponding to a product so that the server of the service provider returns to him a page providing information about the product in question. The user can also receive this information by means of the platform by electronic message (email) or text message (SMS) if he so requires. These SMSs and emails can comprise a code that the customer can use once in the shop in order to obtain personalized information or promotions.

As an alternative to the input of an alphanumeric code, the user can also use traditional means such as "flashcodes", "QRcodes" or even NFC ("Near Field Communication") technology.

Within the context of a trade show, a visitor can select available mobile services corresponding to the services delivered by the trade show and its exhibitors. These services can comprise indication: of the various schedules of the demonstrations taking place at the trade show and the possibility of joining them, and the list of restaurants and their menus and the possibility of making reservations, of the map of the trade show, and the list of exhibitors with a link to the mobile site of the exhibitor, etc. If an exhibitor interests the user of the mobile terminal, then the latter can connect to the site of this exhibitor and contact the various officials on the stand, find out the agenda for the day, etc. by means of the platform. At the request of the user, stand officials can also be contacted by setting up a voice communication or by SMS by means of the platform. The visitor will thus be able to contact the stand official desired without having to provide his mobile terminal number and without knowing the telephone number of the person whom he is contacting.

On a stand presenting products associated with alphanumeric codes, by inputting an alphanumeric code on the page of the mobile site of the stand, the visitor can access a page that allows him to obtain information about the product associated with the input code and, with one click, can request receipt of an email that will contain a link and a document, for example in PDF ("Portable Document Format") format, relating to the detailed presentation of the product. This can allow advantageous replacement of the fairly unusable paper documentation usually provided on the stands of a trade show.

Within the context of a museum, a visitor having a mobile terminal can be offered useful information such as the map of the museum or a list of events of the day such as demonstrations. The visitor can also use the page of the museum to input an alphanumeric code offered beside an exhibited object in order to obtain complementary information about the object such as photographs, an explanatory text and possibly an audio description.

Within the context of a hotel, a customer of the hotel can contact room service, the restaurant to find out the menu of the day and make a reservation, or else can have advertisements about tourist activities in the region that have been negotiated by the hotel. He can use paid services by entering his room number or can order a beverage of his choice remotely at the edge of the pool without having to wait for the waiter. Advantageously, such services are available inside and outside the hotel up to a certain distance therefrom, for example 50 km.

The invention claimed is:

1. A method to be performed in at least one server of a service provider, the service provider providing as services at least one of coupons, messaging or access broadcast services, the method comprising:
   receiving an information representative of a connection of a mobile terminal to a service platform of a mobile network, said representative information comprising a provider alias stored by the service platform of the mobile network, for one or more service providers, in association with an anonymous operator alias uniquely associated to a user identifier of the mobile terminal inside the mobile network;
   obtaining first data relating to at least one first transaction performed by the service provider previously to said receiving, by using said provider alias;
   setting up, via the service platform, a communication link between the service provider server and the mobile terminal, wherein, in the communication link, said provider alias of said mobile terminal is used, between said server and said service platform, for interchanges regarding said mobile terminal; and
   sending to the mobile terminal, via said communication link, information about at least one service offered by the service provider, the offered service depending on the first data relating to the previous first transaction and associated with the provider alias of said mobile terminal.

2. The method as claimed in claim 1, comprising receiving, by the server of the service provider, and storing, in association with the provider alias of said mobile terminal, second data relating to a second transaction performed by the service provider via said communication link.

3. The method as claimed in claim 1, in which at least some of the transmitted information is personalized according to the first data for the user identified by the provider alias.

4. A non-transitory computer-readable medium comprising a computer program product stored thereon and comprising code instructions for executing the method according to claim 1.

5. The method of claim 1, wherein said receiving is performed depending on a location of the mobile terminal associated with said anonymous operator alias and to an area of availability of at least one service provided by said service provider.

6. A server of a service provider providing as services at least one of coupons, messaging or access broadcast services, the server comprising:
   a database;
   a processor;
   a non-transitory computer-readable medium comprising instruction stored thereon, which when executed by the processor configure the server to:
      receive an information representative of a connection of a mobile terminal to a service platform of a mobile network, an anonymous operator alias being uniquely associated to the mobile terminal inside the mobile network;
      obtain from the database, first data relating to at least one first transaction performed by the service provider previously to a receiving of said representative information, by using said provider alias; and
   a communication interface, which is configured to:
      set up, via the service platform, a communication link between the service provider server and the mobile terminal, wherein, in the communication link, said provider alias of said mobile terminal is used, between said server and said service platform, for interchanges regarding the mobile terminal; and
      send to the mobile terminal, via said communication link, information about at least one service offered by the service provider, the offered service depending on the first data relating to the previous first transaction and associated with the provider alias of said mobile terminal.

7. A service platform of a mobile network, said service platform comprising at least one processor and a non-transitory computer-readable medium comprising instruction stored thereon, which when executed by the at least one processor configure the service platform to:
   receive a connection request of a mobile terminal of the mobile network, an anonymous operator alias being uniquely associated to a user identifier of the mobile terminal inside the mobile network;
   transmit a provider alias stored by the service platform of the mobile network, for one or more service providers in association with said anonymous operator alias, to at least one server of a service provider, the service provider providing as services at least one of coupons, messaging or access broadcast services; and set up a communication link between the service provider server and the mobile terminal, wherein the communication link uses, between said server and said service platform, said provider alias of said mobile terminal for interchanges.

8. A method to be performed in at least one service platform of a mobile network, the method comprising:

receiving a connection request of a mobile terminal of the mobile network, an anonymous operator alias being uniquely associated to a user identifier of the mobile terminal inside the mobile network;

transmitting a provider alias, stored by the service platform of the mobile network, for one or more service providers in association with said operator alias, to at least one server of a service provider, the service provider providing as services at least one of coupons, messaging or access broadcast services; and setting up a communication link between the service provider server and the mobile terminal, wherein the communication link uses, between said server and said service platform, said provider alias of said mobile terminal for interchanges.

9. The method as claimed in claim 8, wherein—the anonymous operator alias is obtained, by the service platform of the mobile network, following an identification of the mobile terminal by a network entity of the mobile network on the basis of a user identifier of said terminal.

10. The method as claimed in claim 8, comprising, when receiving, via said communication link, a request from the mobile terminal, containing the anonymous operator alias and intended for a server of a service provider, replaces the anonymous operator alias with the provider alias corresponding to the service provider in question.

11. The method as claimed in claim 8, in which the service platform of the mobile network has a list of at least one service associated with at least one geographical area of availability, wherein the method further comprises:

obtaining, by the service platform, a piece of location information for the mobile terminal; and according to said location information obtained and the list of services, determining at least one service, called an available service, associated with at least one geographical area of availability in which the mobile terminal is located, wherein said server is a server of a provider of at least one selected service from among the determined available service(s).

12. The method as claimed in claim 11, in which obtaining a piece of location area information for the terminal is triggered following a detection of a connection from the mobile terminal to the service platform or by receipt of a request message transmitted by the mobile terminal in order to obtain from the service platform a list of available services.

13. The method as claimed in claim 11, in which the platform identifies a selected available service by implementing the following acts:

transmitting, to the mobile terminal, a list of available services corresponding to the geographical area in which the mobile terminal is located, and receiving an identification message for at least one selected service among the determined available services, from the mobile terminal.

14. The method as claimed in claim 8, comprising transmitting, to the mobile terminal, following the correct input of a USSD code on the user's mobile terminal, a message allowing connection of the mobile terminal to a service platform of the mobile network.

15. The method as claimed in claim 8, comprising transmitting, to the server of the provider of the selected service, an alphanumeric code input on a user interface of the mobile terminal so that said server of the service provider delivers a service associated with said alphanumeric code.

16. The method as claimed in claim 8, comprising at least one act, from among an act of transmitting, to the mobile terminal, electronic mail or text messages from the server of the provider of the selected service and/or an act of setting up voice communications with the mobile terminal.

17. A non-transitory computer-readable medium comprising a computer program product stored thereon and comprising code instructions for executing a method according to claim 8.

* * * * *